(12) United States Patent
Behm et al.

(10) Patent No.: US 8,229,691 B2
(45) Date of Patent: Jul. 24, 2012

(54) METHOD FOR USING REAL-TIME APC INFORMATION FOR AN ENHANCED LOT SAMPLING ENGINE

(75) Inventors: Gary W. Behm, Hopewell Junction, NY (US); Malek Ben Salem, Wappingers Falls, NY (US); Yue Li, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 12/135,514

(22) Filed: Jun. 9, 2008

(65) Prior Publication Data

US 2009/0306803 A1 Dec. 10, 2009

(51) Int. Cl.
*G01N 37/00* (2006.01)
(52) U.S. Cl. .......... 702/81; 702/82; 702/83; 702/84; 702/113; 702/180; 702/183; 702/179; 702/181; 702/182; 702/189; 700/121; 438/14
(58) Field of Classification Search .......... 702/81, 702/82, 83, 84, 113, 179, 180, 181, 182, 702/183, 189; 700/121; 438/14
See application file for complete search history.

(56) References Cited

U.S. PATENT DOCUMENTS

| | | | | |
|---|---|---|---|---|
| 5,225,998 | A * | 7/1993 | Singhal | 702/84 |
| 6,477,432 | B1 * | 11/2002 | Chen et al. | 700/51 |
| 6,950,716 | B2 * | 9/2005 | Ward et al. | 700/121 |
| 6,965,808 | B1 * | 11/2005 | Conrad et al. | 700/108 |
| 7,050,879 | B1 * | 5/2006 | Wang et al. | 700/121 |
| 7,340,318 | B1 * | 3/2008 | Cherry et al. | 700/109 |
| 2005/0038916 | A1 * | 2/2005 | Nguyen | 709/250 |
| 2005/0095774 | A1 * | 5/2005 | Ushiku et al. | 438/222 |
| 2005/0177269 | A1 * | 8/2005 | Funk | 700/121 |
| 2006/0161288 | A1 * | 7/2006 | Imai | 700/121 |
| 2006/0206851 | A1 * | 9/2006 | Van Wingerden et al. | 716/19 |
| 2009/0171638 | A1 * | 7/2009 | Morisawa et al. | 703/7 |

OTHER PUBLICATIONS

Holfeld et al, "A Fab-wide APC Sampling Application", Nov. 2007, IEEE Transaction on Semiconductor Manufacturing, vol. 20, No. 4, p. 393-399.*
Fuller et al, "Improving Manufacutring Performance at the Rochester Insitute of Technology Integrated Circuit Factory", 1995, IEEE/SEMI Advanced Semiconductor Manufacturing Conference, p. 350-355.*
NIST/SEMATECH e-Handbook of Statistical Method, (2003-2006).*
Chen et al., "Fuzzy evaluation of process capability for Bigger-the-Best type products," Int. J. Adv. Manuf. Technol (2003).*
Holfeld et al., "A fab-wide sampling application," IEEE transactions on semiconductor manufacturing, vol. 20, No. 4 (2007).*

* cited by examiner

*Primary Examiner* — Drew A Dunn
*Assistant Examiner* — Hyun Park
(74) *Attorney, Agent, or Firm* — Ian D. MacKinnon; Roberts Mlotkowski Safran & Cole, P.C.

(57) ABSTRACT

A method includes passing a lot through a production process and evaluating a statistical quality of the production process. Additionally, the method includes calculating an advanced process control (APC) recipe parameter adjustment (RPA) distribution value and determining if sampling is indicated. Furthermore, the method includes, if sampling is indicated, performing a measurement process of the lot.

16 Claims, 9 Drawing Sheets

| Scenario | Actions | Data Source | Sampling Rate | Weighting |
|---|---|---|---|---|
| 1.) | Rework lot, it must be measured | MM | 100% | n/a |
| 2.) | SAHD lot, it must be measured | APC | 100% | n/a |
| 3.) | If the lot was measured in pre-step, it will be measured in post-step | SM | 100% | n/a |
| 4.) | Manual rules: for a given process PDID, measurement PDID, logical recipe or process tool, X percentage sampling rate is defined regardless of Cp/Cpk value. It is based on business decisions. | ELSE | configurable | |
| 5.) | APC RPA Distribution value | APC | use FIG. 6 | 20% (configurable) |
| | APC Calculated Measurement Cpk value | APC | use FIG. 6 | 40% (configurable) |
| | Historical Data Cpk value (28 days average) | DMIW | use FIG. 6 | 40% (configurable) |

METHOD FOR USING REAL-TIME APC INFORMATION FOR AN ENHANCED LOT SAMPLING ENGINE

FIELD OF THE INVENTION

The present invention generally relates to a method and system of semiconductor fabrication, and more specifically, to a method and system of semiconductor fabrication using real-time Advanced Process Control (APC) information for an enhanced Lot Sampling Engine (ELSE).

BACKGROUND

Currently in the 300 mm semiconductor fabricator, there is no relationship between the fab-wide Advanced Process Control (APC) system and the Lot Sampling Engine (LSE). As a separate system, the APC system relies on pre-measurement, post-measurement and operational data to calculate the recipe parameter required for the process tool to perform the wafer process on target. Ideal for optimizing the recipe parameter adjustment (RPA) is to measure every wafer. However, there is a tradeoff with the cost of producing the wafers and wasting cycle time.

Before utilization of the LSE, sampling was fixed by route, e.g., determined by a lot attribute assigned at a beginning or early stage of a manufacturing process, and not linked to manufacturing process capability and/or performance. The attribute assured that a certain percentage of work-in-progress (WIP) was measured at various inspection points before and/or after each operation of a production process. Unfortunately, the attribute did not account for performance of the operation. Thus, when the process was performing poorly, not enough lots were being measured, and when the process was performing well, too many lots were being measured, thus wasting cycle time.

Thus, the LSE was developed, which provides a sampling plan to optimize the throughput of the process. From manufacturing's perspective, measurement is an overhead and it has no value if it is not really necessary to be measured. When the process is performing well, the manufacturer may be measuring too many lots and wasting cycle time. However, with the LSE, the sampling rate is linked to the process capability. With this smart sampling method, the cycle time is no longer wasted on processes that are performing well. Instead, the focus is on those processes that need more measurements for process improvement.

However, there is a problem when the LSE decides to bypass the measurement (e.g., for throughput benefit), in that the APC system is not able to calculate the optimized value for the recipe parameter adjustment (RPA) due to limited number of measurements (yield degradation). The LSE uses a process capability index (Cp/Cpk metrics) to adjust sampling rates and reduce the Mean Time To Detect (MTTD). Determining process capability involves measuring a variability of a process and comparing the measured variability with a proposed specification or product tolerance. However, the Cp/Cpk metrics are calculated over a 28 day period and are only updated once a week. So, the LSE does not react to the tool/process issues quickly enough.

Another challenge is created by "Send Ahead" (SAHD) operations. In normal manufacturing operations, there is no need to use, for example, SAHD wafers. However, when tolerance variation in a particular process is unacceptable, SAHD is required in order to prevent scrap. SAHD is also necessary for low volume parts to speed yield learning. In either case, no SAHD lot should be skipped by a sampling plan. However, when relying on an attribute to determine sampling, many SAHD lots are not sampled. Without real time integrated product and process information, it is difficult, if not impossible, to establish a sampling rate that can account for a lot attribute, process performance, and SAHD lots in a manufacturing process. When relying solely on a lot attribute, or manual sampling, a lot may be sampled too often, or not often enough. Sampling, i.e., measurement, is a non-value added operation and actually slows production. Thus, over sampling can be costly. However, if too few lots are sampled, defective lots can pass through production. In this case, final testing costs are increased and a company's reputation for quality may be at risk.

However, there is no known system that correlates the benefits of both the APC system and the LSE system, by providing real-time LSE information to the APC system, such that both systems are integrated and optimized for the lot sampling plan without affecting the APC operations.

Accordingly, there exists a need in the art to overcome the deficiencies and limitations described hereinabove.

SUMMARY

In a first aspect of the invention, a method comprises passing a lot through a production process and evaluating a statistical quality of the production process. Additionally, the method comprises calculating an advanced process control (APC) recipe parameter adjustment (RPA) distribution value and determining if sampling is indicated. Furthermore, if sampling is indicated, the method comprises performing a measurement process of the lot.

In an additional aspect of the invention, a computer program product comprises a computer usable medium having readable program code embodied in the medium. The computer program product includes at least one component operable to pass a lot through a production process and evaluate a statistical quality of the production process. Additionally, the at least one component is operable to calculate an advanced process control (APC) recipe parameter adjustment (RPA) distribution value and determine if sampling is indicated. Furthermore, the at least one component is operable to perform a measurement process of the lot, if sampling is indicated.

In a further aspect of the invention, a system comprises a wafer processing station and an advanced process control (APC). Additionally, the system comprises an enhanced lot sampling engine (ELSE) in communication with the APC and configured to receive APC recipe parameter adjustment (RPA) information and APC calculated process capability (Cpk) information from the APC. Further, the ELSE is configured to determine a sampling rate for a lot based on historical Cpk information, the APC RPA information from the APC and the APC calculated Cpk information from the APC.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 5 shows an exemplary table of ELSE rules in accordance with the invention;

DETAILED DESCRIPTION

The present invention generally relates to a method and system of semiconductor fabrication, and more specifically, to a method and system of semiconductor fabrication using real-time Advanced Process Control (APC) information for an enhanced Lot Sampling Engine (ELSE). The present invention provides a method and system to use APC information by the enhanced LSE system to determine the optimized sample plan required for processing the lots through the route. By implementing the present invention, manufacturing with higher throughput and higher yield may be obtained, by providing a smart sampling mechanism which enforces lot measurement and measurement data collection where needed by the APC. Additionally, higher throughput and higher yield may be obtained by optimizing the throughput/cycle time by minimizing sampling, while maintaining a desirable level of APC control. Furthermore, Mean Time To Detect (MTTD) may be reduced by 50% by feeding additional information to the ELSE and reaching to currently available information sooner. Additionally, the yield learning curve may be improved on low volume products and/or routes through measurement on SAHD lots.

Figure 1:
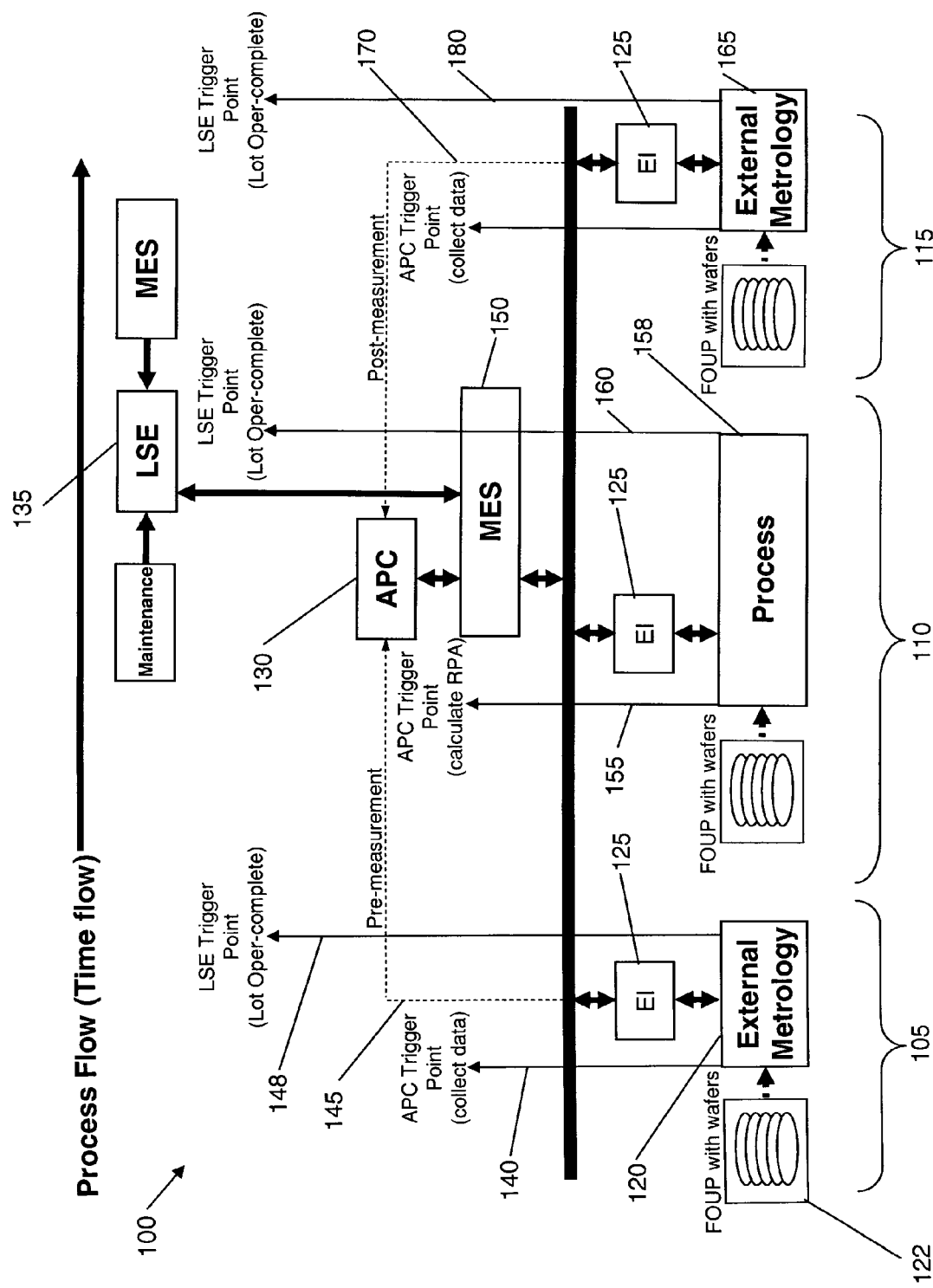
FIG. 1 shows an overall system for use in semiconductor wafer manufacturing.

FIG. 1 shows an overall system 100 used in semiconductor fabrication including an APC system 130 and an LSE system 135. As shown in FIG. 1, a measurement stage 105 is performed in an external metrology tool 120 on a lot of wafers contained in, e.g., a front-open unified pod (FOUP) 122. More specifically, an APC trigger point signal 140 indicates that the lot of wafers are to be measured and measurement data is to be collected. The external metrology tool 120 performs a measuring process, and via an equipment interface (EI) 125, the measurements are sent to the APC 130. As shown in FIG. 1, the measurement data 145 is indicated as "pre-measurement" data, as this measuring stage is performed prior to a process stage. In other words, the measurement data 145 is a pre-process measurement. At the end of the measurement stage 105, an LSE trigger point signal 148 is sent to the LSE 135 to indicate that the measuring stage 105 is complete.

A manufacturing execution system (MES) 150 is responsible for coordinating and controlling the movements of the lots of wafers, e.g., the FOUPs 122 and for the automatic collection of data, e.g., measurement data and process data. Thus, after collection of the measurements taken at the measurement stage 105, the MES 150 forwards the lot of wafers to a process stage 110, where the wafers are further processed in a process tool 158 in conjunction with the APC 130. For example, the APC 130 may make recipe parameter adjustments (RPAs) based on, e.g., feed forward controls. An APC trigger point signal 155 may be sent to the APC 130 to indicate a calculation of the RPAs. Again, the communication between the process tool 158 and both the MES 150 and the APC 130 may be facilitated using an equipment interface (EI) 125.

At the end of the process step 110, an LSE trigger point signal 160 is sent to the LSE 135 to indicate that the process stage 110 is complete and request a determination by the LSE 135 as to whether the next measurement stage, e.g., 115, should be skipped or not. For example, the LSE 135 may determine, based on, e.g., rules, historical process capability and/or lot specific rules, to perform the next metrology stage 115, or to skip the next metrology stage 115 and proceed to the next process stage (not shown).

Thus, if the LSE trigger point signal 160 indicates that the next measurement stage 115 should be skipped, the lot of wafers 122 is not sent to the next measurement stage 115, and instead the lot of wafers is sent to a next processing stage (not shown). However, if the response to LSE trigger point signal 160 indicates that the next measurement stage 115 should be performed, the lot of wafers is forwarded to the next measurement stage 115. At the next measurement stage 115, another external metrology tool 165 performs a measurement process of the lot of wafers and measurement data 170 is sent from the external metrology tool 165 to the APC 130 via another EI 125. At the end of the measurement stage 115, an LSE trigger point signal 180 is sent to the LSE 135 to indicate that the measurement stage 115 is complete.

In this way, a lot of wafers may proceed through a manufacturing process comprising, for example, a series of measurement steps and a series of process steps. However, as shown in FIG. 1, there is no direct exchange of data between the APC and the LSE. Therefore, the LSE is not provided with real-time data from the APC.

Figure 2:
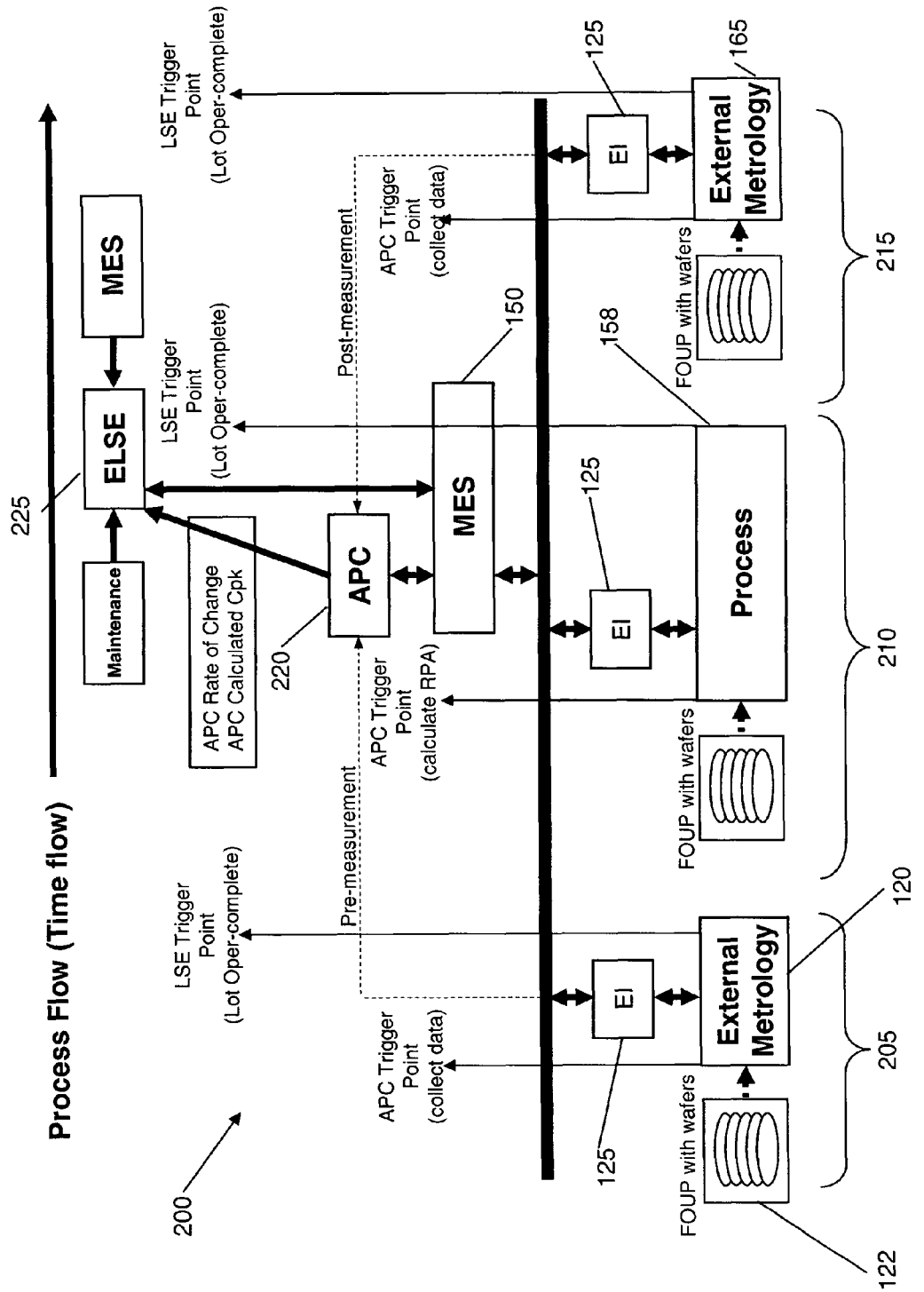
FIG. 2 shows an overall system for use in semiconductor wafer manufacturing with an enhanced lot sampling engine (ELSE) in accordance with the invention.

FIG. 2 shows an overall integrated circuit manufacturing system 200 which includes an enhanced lot sampling engine (ELSE) 225 in direct communication with an APC 220 in accordance with an aspect of the invention. According to an aspect of the invention, the APC 220 may send the ELSE 225 real-time information, e.g., feedback of process performance, in order for the ELSE 225 to make a determination to proceed to the next measurement stage 215 or skip the next measurement stage 215. As shown in FIG. 2, the APC 220 may send the ELSE 225 additional sampling rate information. More specifically, the APC 220 may send to the ELSE 225 APC rate of change data (or recipe parameter adjustment (RPA) data) and APC calculated Cpk data. According to an aspect of the invention, the ELSE 225 may use this additional data from the APC in conjunction with the historical Cpk data (e.g., determined over 28 days and updated weekly) to make a more useful decision to proceed to the next measurement stage or skip the next measurement stage, as explained further below.

In embodiments, the APC recipe parameter adjustment (RPA) distribution data may be a statistical distribution of the recipe parameter adjustments with a standard deviation based on, e.g., 10 lots. Additionally, in embodiments, the APC calculated measurement Cpk may be a statistical distribution of the process capability based on, e.g., 7 days of minimal of 8 lots per day, or, in embodiments, may depend on the volume of the lots that go through the APC 220. Further, the historical Cpk is a statistical distribution of the process capability based on, e.g., 28 days and updated on weekly basis.

Figure 3:
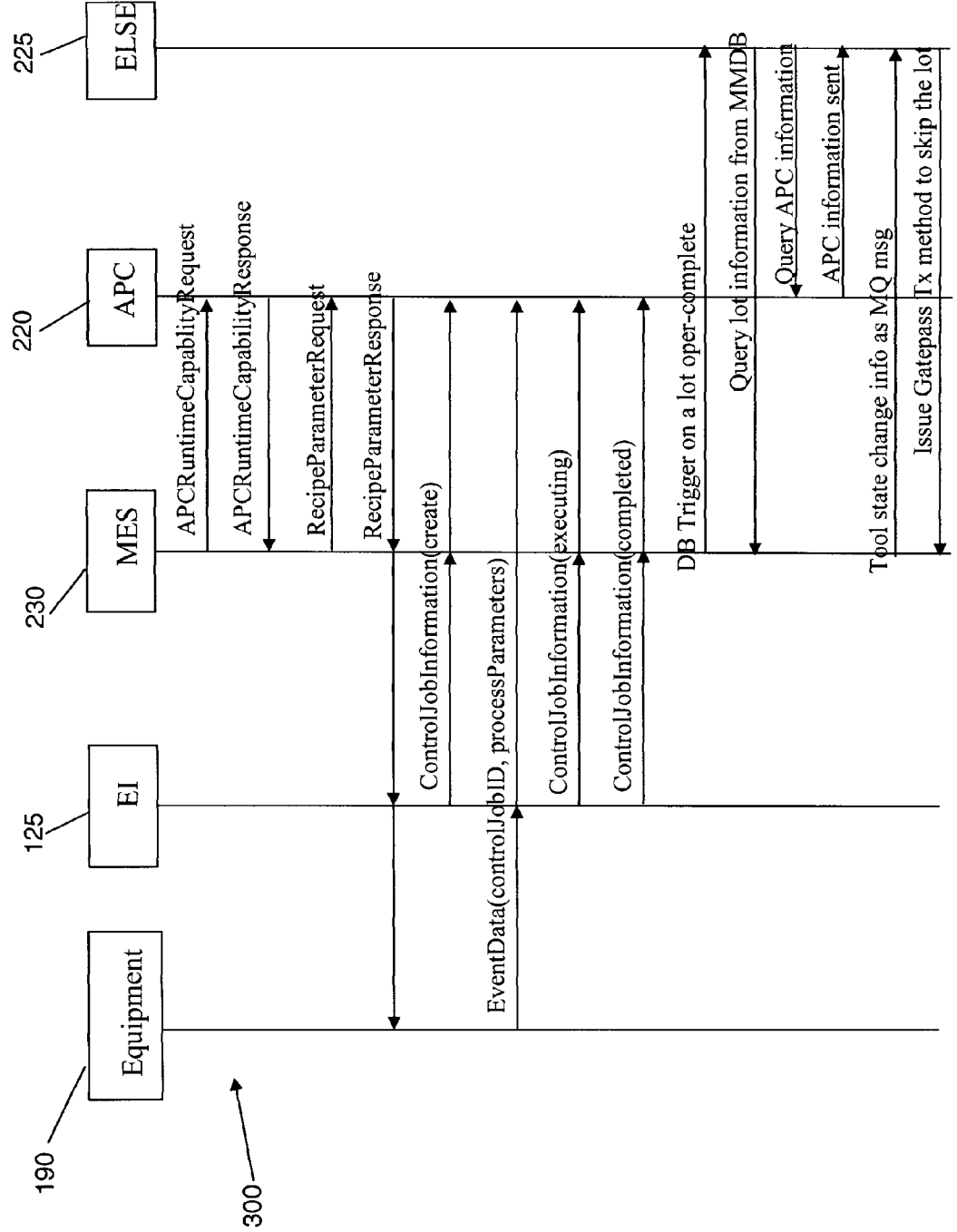
FIG. 3 shows a timing diagram of a method for advanced process control (APC) with an ELSE in accordance with the invention.

FIG. 3 shows an exemplary timing diagram of communications between the different elements of the present invention. As shown in FIG. 3, the MES 230 sends an APC runtime capability request to the APC 220. In response, the APC 220 sends an APC runtime capability response to the MES 230. Next, the MES 230 sends a recipe parameter request to the APC 220. In response, the APC 220 sends a recipe parameter response to the MES 230, the EI 125 and equipment 190, e.g., the processing tool 158. Next, the EI 125 sends control job information (create) to the MES 230 and the APC 220. Additionally, the equipment 190 sends event data (e.g., control job ID and/or process parameters) to the APC 220. The EI 125 sends a control job information (executing) signal, and subsequently, a control job information (completed) signal to the MES 230 and the APC 220.

In response to the control job information (completed) signal, the MES 230 sends a database (DB) trigger on a lot operation complete to the ELSE 225. In response, the ELSE 225 sends a lot information query from a materials manager database, which is a real-time database. Additionally, the ELSE 225 may query the APC 220 for information, e.g., the APC RPA distribution information and the APC calculated Cpk. In response, the APC 220 sends information to the ELSE 225, e.g., the APC RPA distribution information and the APC calculated Cpk. Next, the MES 230 sends a tool state change information to the ELSE 225. In response and based on the APC RPA distribution data, the APC calculated Cpk, and a historical Cpk, the ELSE 230 issues a gatepass transaction signal indicating either moving to a subsequent measurement stage or skipping the subsequent measuring stage.

Figure 4A:
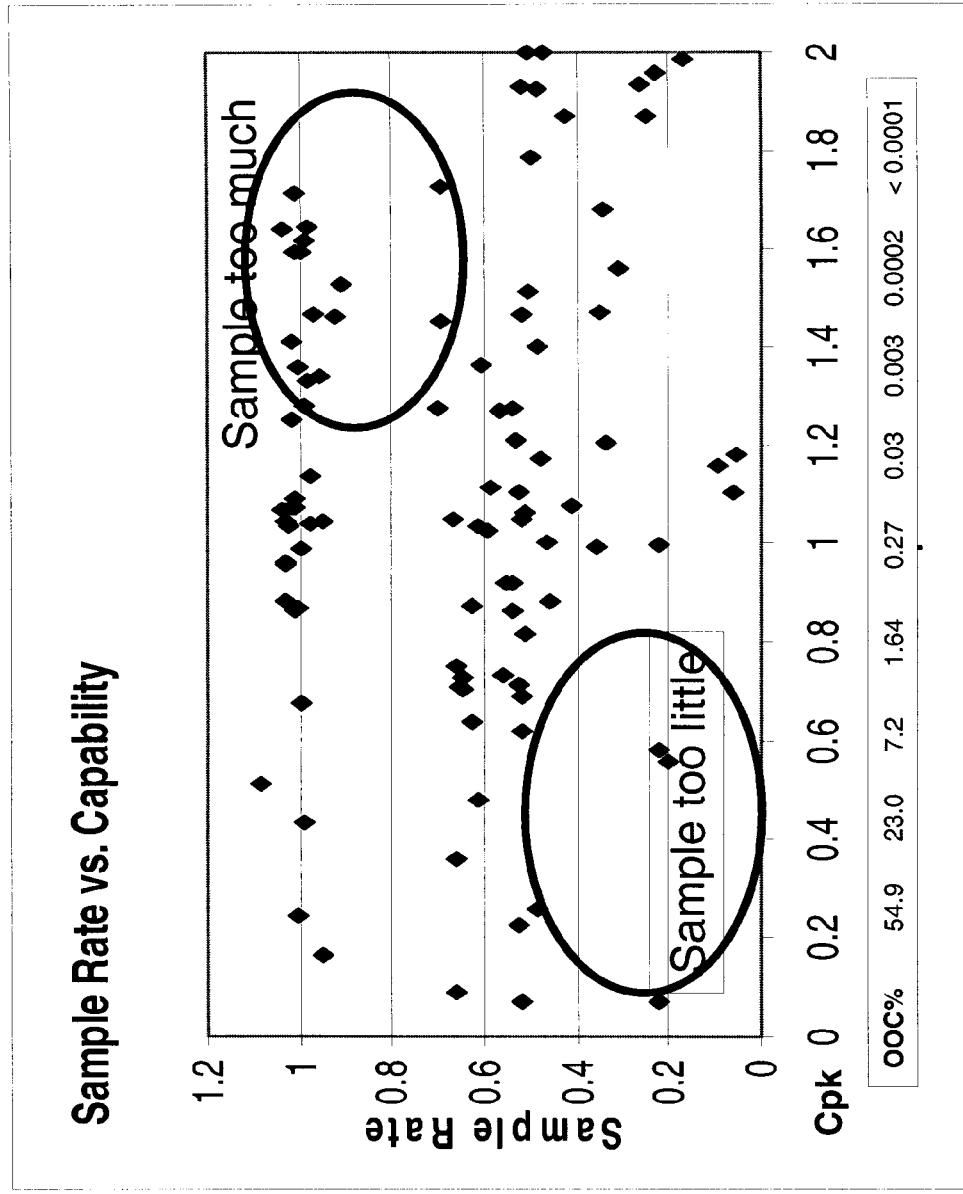
FIG. 4A shows an exemplary plot of lot sampling rate versus process capability obtained without using a lot sampling engine.

FIG. 4A shows an exemplary plot 400 of sample rate versus process capability (and out of control (OOC) percentage) obtained without using an LSE. As shown in FIG. 4A, a low process capability (Cpk) value indicates a process is performing poorly. Conversely, a high Cpk value indicates a process is performing well. This is also shown by the OOC % scale, which indicates that a low Cpk value corresponds to a high OOC %, and vice versa. In embodiments, OOC % may assume a centered process and no vintages. As shown in FIG. 4A, the lot sampling is occurring too infrequently when it is needed, i.e., when the process is performing poorly and sampling too frequently when sampling is not needed, i.e., when the process is performing well. As discussed above, an aim of the present invention is to reduce the sample rate when the process is performing well (to prevent wasted time and resources) and to increase the sampling rate when the process is performing poorly.

Figure 4B:
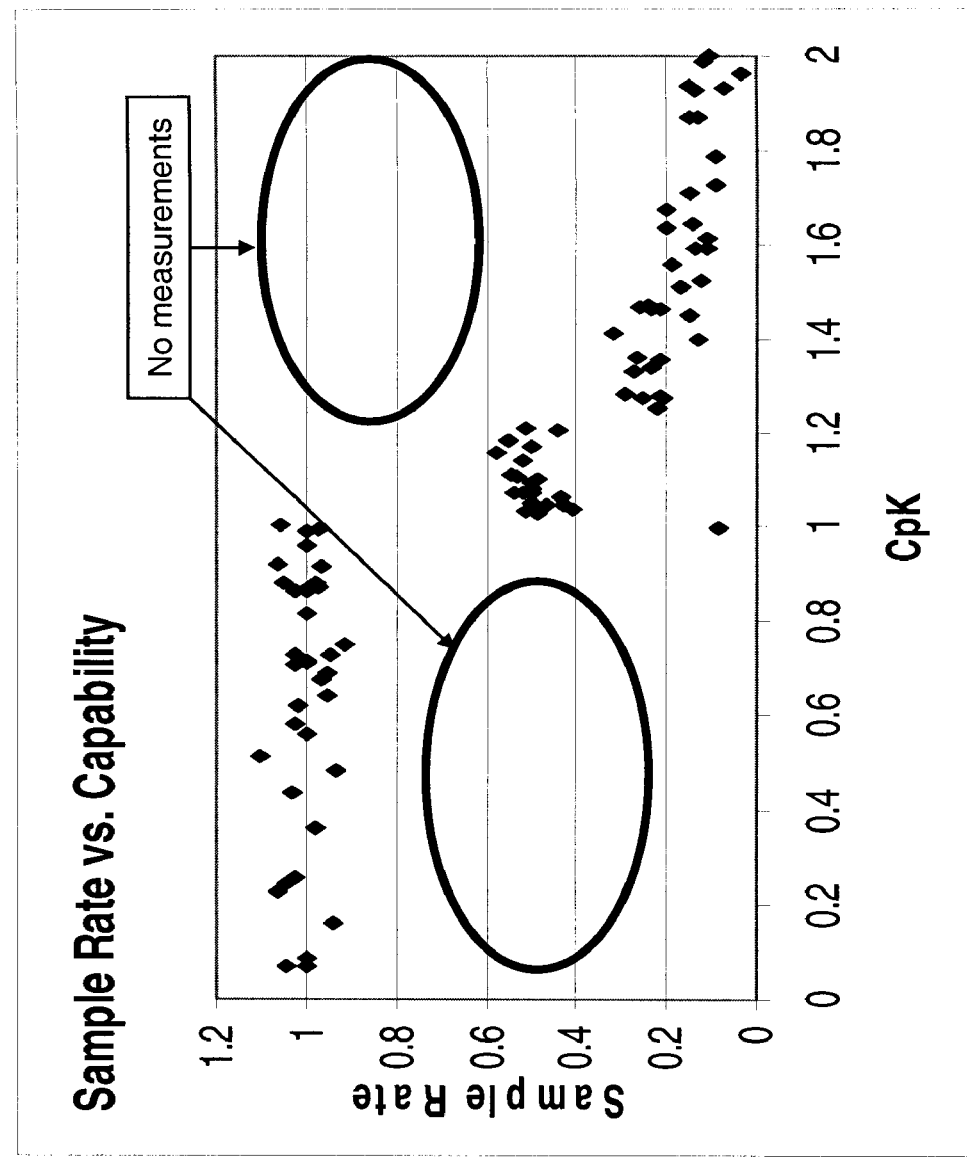
FIG. 4B shows an exemplary plot of lot sampling rate versus process capability obtained using a lot sampling engine.

FIG. 4B shows an exemplary plot 450 of sample rate versus process capability achievable by implementing aspects of the present invention. As shown in FIG. 4B, when the process is performing well (high Cpk), the sample rate is lower and when the process is performing poorly (low Cpk), the sample rate is higher.

FIG. 5 shows a table 500 containing a hierarchy of rules the ELSE 225 may use to determine whether to perform a measurement step or to skip the measurement step and proceed to the next processing step. As shown in FIG. 5, the rules are applied differently for different scenarios. FIG. 5 includes a scenario column 505, an action column 510, a data source column 515, a sampling rate column 520 and a weighting column 525.

As shown in FIG. 5, with a first scenario relating to a rework lot, a measurement stage is always performed subsequent to a processing stage, and thus has a sampling rate of 100%. For example, a rework lot may involve a rework of a lot due to wafer under polishing. The data source for a rework scenario is the materials manager (MM) of the MES 230. As there is a 100% sampling rate with this scenario, and there is only a single data source, as indicated in the weighting column 525, a weighting is not applicable for this scenario.

With a second scenario relating to a SAHD lot, a measurement stage is always performed subsequent to a processing stage, and thus has a sampling rate of 100%. The data source for a SAHD lot scenario is the APC 220. As there is a 100% sampling rate with this scenario, and there is only a single data source, as indicated in the weighting column 525, a weighting is not applicable for this scenario.

With a third scenario relating to a lot that was measured in a pre-step, the lot will be measured in a post-step. For example, if a thickness was measured in a pre-processing stage and then the thickness is altered in a processing stage, in order to determine the change in thickness, the thickness should be measured in a post-processing stage. Thus, as indicated in the sampling rate column 520, for this scenario the sampling rate is 100%. Further, as indicated in the weighting column 525, as there is a single data source for this scenario the weighting is not applicable.

With a fourth scenario relating to manual rules, a sampling rate may be configurable regardless of determined Cpk values. That is, with this scenario, manual rules may override any Cpk rules. For example, for a given process PDID (process definition identification), a measurement PDID, a logical recipe or a process tool, a sampling rate percentage may be defined regardless of determined Cpk values. A sampling rate may be defined using manual rules, for example, based on business decisions. If time is of the essence, for example, sampling rates can be reduced to accommodate delivery of lots. In embodiments, as indicated in the data source column 515, the data source for this scenario is the ELSE 225. Further, as indicated in the weighting column 525, as there is a single data source for this scenario, a weighting is not applicable.

With a fifth scenario, a sampling rate may be determined based on a weighted average of the sampling rates determined from the APC RPA distribution value, the APC measurement Cpk value and the historical data Cpk value. More specifically, according to an aspect of the invention, the ELSE 225 may determine a suggested sampling rate based on an RPA sampling rate, an APC measurement Cpk sampling rate and an historical data Cpk sampling rate.

Figure 6A:
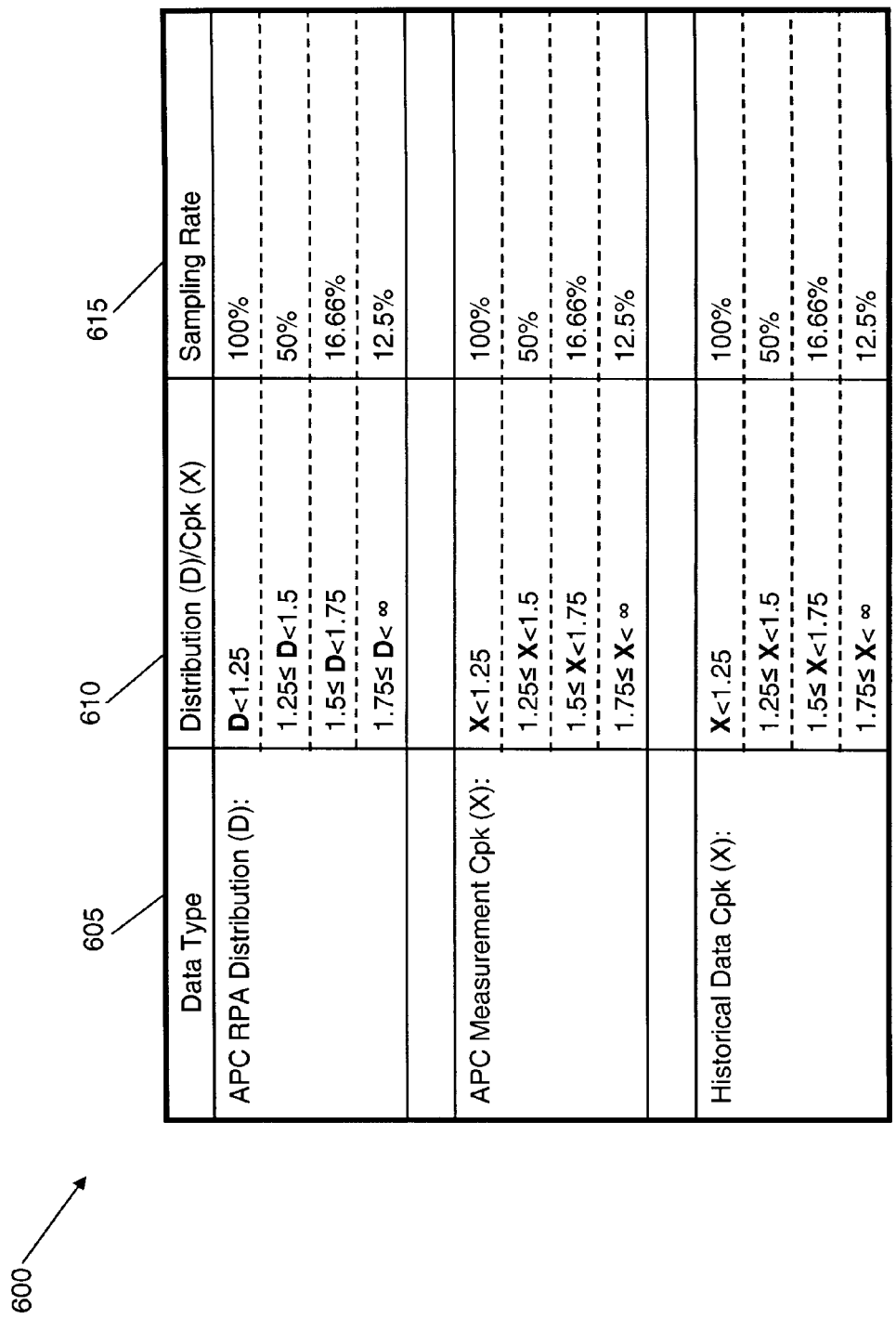
FIG. 6A shows an exemplary table used for determining lot sampling rates in accordance with the invention.

FIG. 6A shows an exemplary table 600 for determining the APC RPA sampling rate, the APC measurement Cpk sampling rate and the historical data Cpk sampling rate based on the APC RPA distribution value, the APC measurement Cpk value and the historical data Cpk value, respectively, using configurable intervals according to an aspect of the invention. As shown in FIG. 6A, the table 600 includes a data type column 605, a Distribution (D)/Cpk (X) column 610 and a sampling rate column 615. While FIG. 6A indicates particular sampling rates for particular ranges of distribution values and Cpk values, it should be understood that the invention contemplates that other sampling rates and other ranges of distribution values and Cpk values may be used. In other words, the intervals set forth in FIG. 6A are configurable intervals.

The APC RPA sampling rate may be determined based on the RPA distribution value, which, in embodiments, is determined according to equation (1).

$$\text{Distribution}(D) = \text{Min}((UCL-\text{Mean})/\text{Sigma}, (\text{Mean}-LCL)/\text{Sigma}) \quad (1)$$

wherein UCL is the upper control limit, LCL is the lower control limit, and Sigma is the standard deviation. The distribution value varies due to changes in the mean value (due to, e.g., changes based on the wafer recipe) and changes of the standard deviation. The UCL and the LCL define measurement limits, that if are exceeded, indicate a defect. As can be observed in FIG. 6A, with a lower distribution value (D), a higher sampling rate is indicated, and with a higher distribution value (D), a lower sampling rate is indicated. Thus, for example, with a distribution (D) value of 1.4, an APC RPA sampling rate would be 50%.

Additionally, as shown in FIG. 6A, the APC measurement Cpk sampling rate may be determined from the APC measurement Cpk value and the historical data Cpk sampling rate may be determined from the historical data Cpk value. In light of FIG. 6A, referring to FIG. 5, the data source for the APC calculated Cpk is the APC 220 and the data source for the historical data Cpk is a historical data repository, e.g., a data management information warehouse (DMIW). As can be observed in FIG. 6A, with a lower Cpk value (X), a higher sampling rate is indicated, and with a higher Cpk value (X), a lower sampling rate is indicated. Thus, for example, with an APC measurement Cpk value (X) of 1.65, an APC measurement Cpk sampling rate would be 16.66%. Additionally, for example, with a historical data Cpk value (X) of 1.9, a historical data Cpk sampling rate would be 12.5%.

With an understanding of FIG. 6A, referring again to FIG. 5, according to an aspect of the invention, as shown in the weighting column 525, with the fifth scenario, in embodiments, relative weights may be assigned to the RPA sampling rate, the APC measurement Cpk sampling rate and the historical data Cpk sampling rate. Thus, with the example shown in FIG. 5, the APC RPA sampling rate may be assigned a weighting of 20%, the APC measurement Cpk sampling rate may be assigned a weighting of 40% and the historical data Cpk sampling rate may be assigned a weighting of 40%. As can be observed the individual weightings sum to a total of 100%. As should be understood, the relative weightings shown in FIG. 5 are exemplary and configurable, and the invention contemplates that other relative weightings may be used.

According to a further aspect of the invention, the ELSE 225 may determine a suggested sampling rate by summing the weighted values of the RPA sampling rate, the APC measurement Cpk sampling rate and the historical data Cpk sampling rate according to equation (2).

Suggested Sampling Rate=(Weighted RPA Sampling Rate)+(Weighted APC Measurement Cpk Sampling Rate)+(Weighted Historical Data Cpk Sampling Rate) (2)

Thus, for example, using the values discussed in the example above with equation (2) and with the exemplary relative weightings indicated in FIG. 5, a suggested sampling rate= $(0.2)(0.5)+(0.4)(0.1666)+(0.4)(0.125)=0.21664=21.664\%$. In contrast, using only the historical data Cpk to determine a sampling rate would result in a sampling rate of 12.5%.

With further embodiments, the APC RPA sampling rate, the APC calculated Cpk sampling rate and the historical Cpk sampling rate may be based on the APC RPA distribution value, the APC measurement Cpk value and the historical data Cpk value, respectively, using an S curve instead of the configurable intervals. With configurable intervals, two process performances may be substantially the same, and yet be assigned different sampling rates. For example, using the configurable intervals, as shown in FIG. 6A, a Cpk value of 1.24999 would indicate a sampling rate of 100%, while a Cpk value of 1.25 would indicate a sampling rate of 50%. Thus, according to an aspect of the invention, an S-curve may be created, for example, using a Sigmoid function, to provide more granularity to the Cpk value-sampling rate correlation.

Figure 6B:
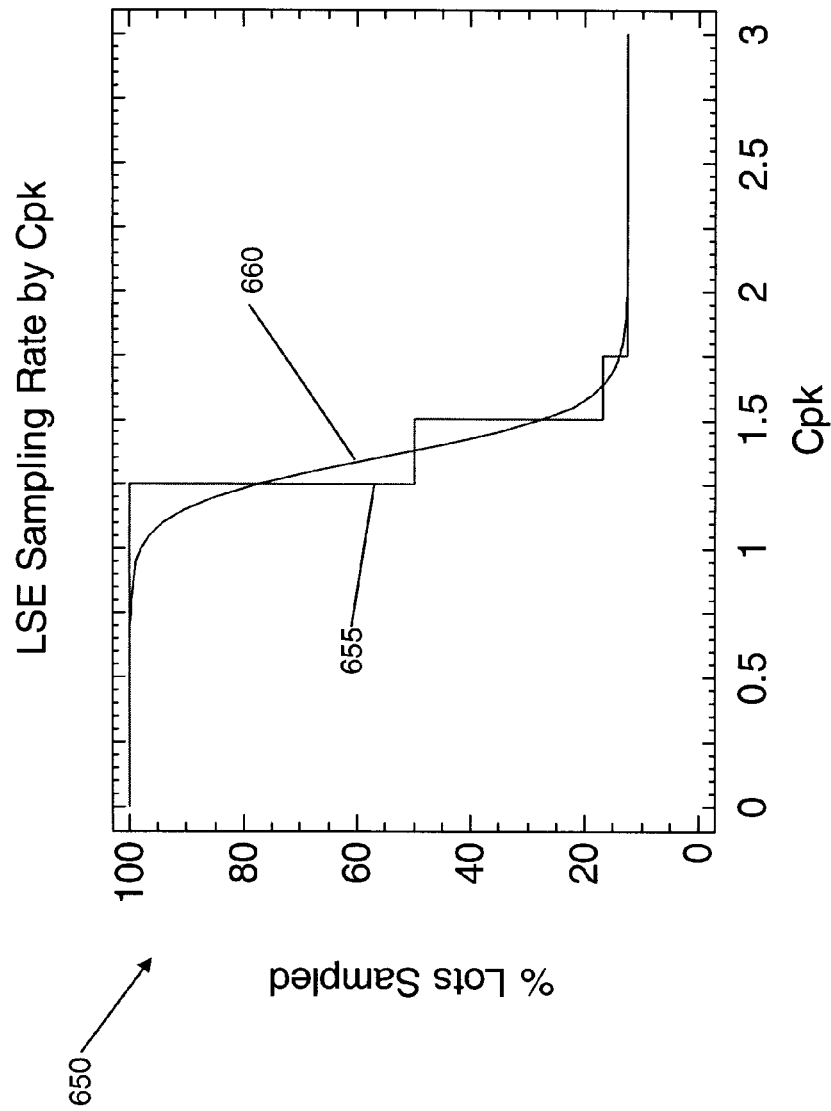
FIG. 6B shows an exemplary plot of LSE sampling rate versus Cpk values with an S-curve in accordance with aspects of the invention.

FIG. 6B shows an exemplary plot 650 of LSE sampling rate versus Cpk values. As shown in FIG. 6B, the exemplary plot 650 includes configurable interval line 655 and S-curve 660. As should be understood, the configurable interval line 655 correlates with the APC measurement Cpk values of FIG. 6A. That is, for example, a Cpk value of less than 1.25 indicates a sampling rate of 100% and a Cpk value greater than or equal to 1.25 and less than 1.5 indicates a sampling rate of 50%, etc. According to an aspect of the invention, the S-curve 660 may be generated to "fit" the configurable interval line 655, such that more granularity is provided in determining a sampling rate. In embodiments, the S-curve 660 may be generated, for example, using the following equation (3):

$$Y=12.5+87.5*(1-1/(1+\exp[-10.5*(X-1.35)]))  \quad (3)$$

wherein X is the Cpk value and Y is the sampling rate. However, it should be understood that different intervals may necessitate a different equation to "fit" the S-curve to the different intervals. Thus, it should be understood that equation (3) is an exemplary equation, and other equations are contemplated by the invention in order to fit an S-curve to the configured intervals.

According to this aspect of the invention, a method may include creating an equation, e.g., a Sigmoid function, that creates an S-curve to "fit" the configurable interval line 655. In embodiments, this may include, for example, experimentally determining the equation, e.g., through trial and error. Additionally, different confidence levels for each different section of the curve may be created. Further, a plot of where the Cpk is on the curve may be generated using the APC calculated Cpk and/or the historical Cpk. Then, using the plot 650 including the S-curve 660, a sampling plan may be optimized to improve cycle time.

Flow Diagram

Figure 7:
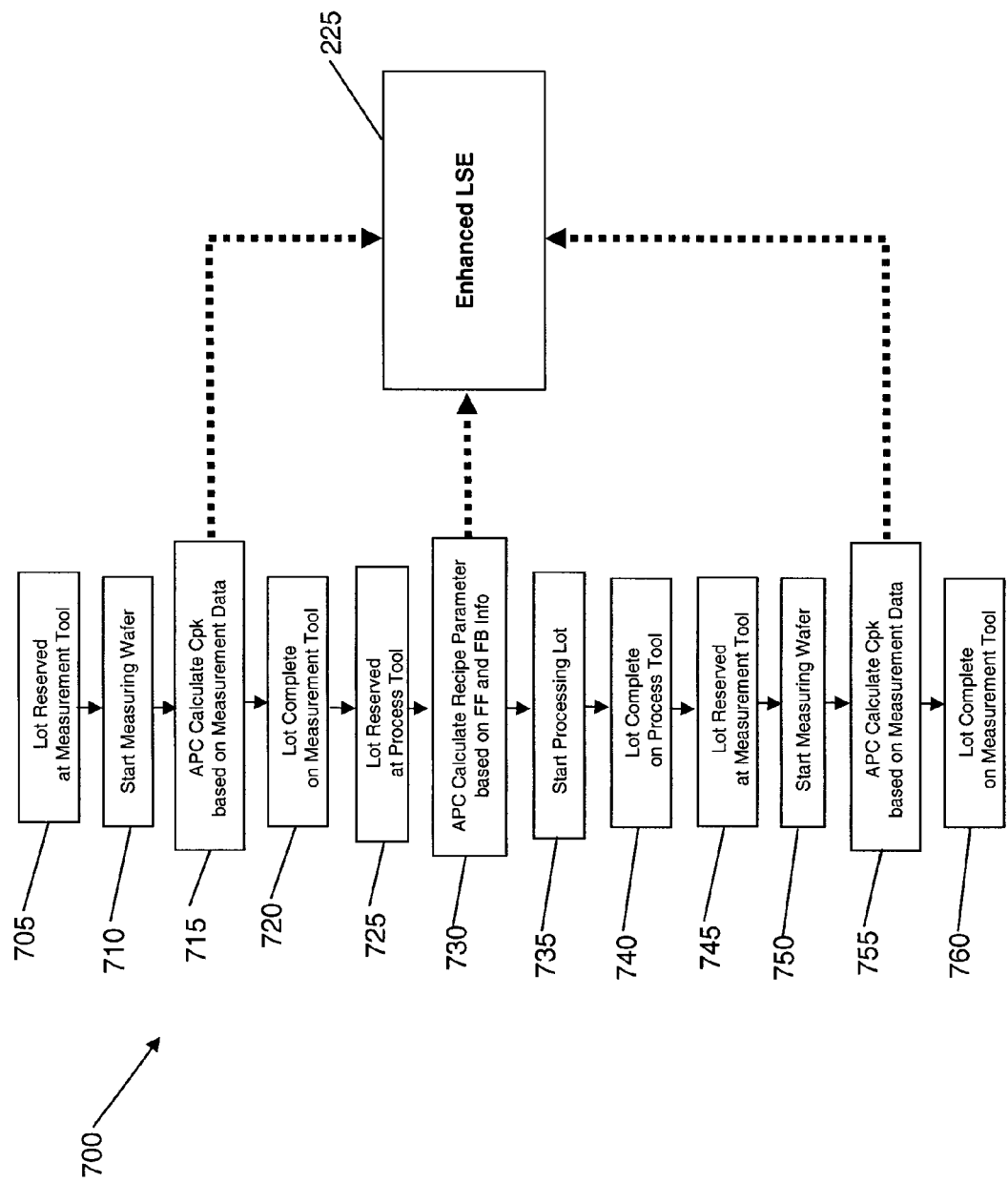
FIG. 7 shows an exemplary flow for performing aspects of the invention.

FIG. 7 shows an exemplary flow 700 describing how the real-time APC information is collected, calculated and passed to the ELSE for an optimized lot sampling plan in accordance with the present invention. FIG. 7 may equally represent a high-level block diagram of components of the invention implementing the steps thereof. The steps of FIG. 7 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. Furthermore, a computer program product may include a computer usable medium having readable program code tangibly embodied in the medium.

At step 705, a lot is reserved at a measurement tool for a pre-processing measurement. At step 710, the measuring of the wafer lot is commenced. At step 715, the APC calculates an Cpk based on the measurement data obtained in step 710. Additionally, at step 715, the APC calculated Cpk is sent to the ELSE. At step 720, the measurement tool completes the measuring of the wafer lot. At step 725, the wafer lot is reserved at a process tool. At step 730, the APC calculates a recipe parameter adjustment (RPA) based, e.g., on feed-forward (FF) and feed-backward (FB) information. Additionally, at step 730, the APC sends the calculated RPA to the ELSE. At step 735, the wafer lot is processed by the processing tool. At step 740, the processing tool completes the processing of the wafer lot. At step 745, the lot is reserved at a measurement tool for a post-processing measurement. At step 750, the wafer lot post-processing measurement is commenced. At step 755, the APC calculates a Cpk based on the measurement data determined at step 750. Additionally, at step 755, the APC sends the calculated Cpk data (which now includes a further measurement) to the ELSE. At step 760, the measurement tool is finished with the wafer lot.

It should be understood, that while the steps have been described as occurring in a particular order, the invention contemplates that the steps may be performed in other orders. Further, as can be observed with the exemplary flow of FIG. 7, the subsequent measurement step (post-processing measurement) is performed and is not skipped. However, as described above, it should be understood that the subsequent measuring stage may be skipped based on the optimized lot sampling plan determined by the ELSE.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method comprising:
    passing a lot through a production process;
    calculating an advanced process control recipe parameter adjustment (RPA) distribution value using an advanced process controller (APC);
    calculating an APC calculated process capability (Cpk) value using the APC;
    communicating the RPA and the Cpk value to a lot sampling engine (LSE);
    utilizing the LSE to correlate the RPA and the Cpk value in conjunction with a historical Cpk value calculated by the LSE to determine if sampling of the lot is indicated; and
    if sampling of the lot is indicated, performing a measurement process of the lot.

2. The method of claim 1, wherein the determining if sampling is indicated is based on at least one of:
    a lot sampling rate;
    the lot being identified as a rework lot or a send ahead (SAHD) lot;
    the lot being measured in a pre-step; and
    manual rules.

3. The method of claim 1, wherein the historical Cpk value is calculated over a period of approximately twenty-eight days and is updated weekly.

4. The method of claim 1, wherein the APC calculated Cpk value is calculated over a period of approximately seven days based on a minimum of eight lots per day.

5. The method of claim 1, further comprising:
    determining an APC RPA sampling rate based on the APC RPA distribution value;
    determining an APC calculated Cpk sampling rate based on the APC calculated Cpk value; and
    determining a historical Cpk sampling rate based on the historical Cpk value.

6. The method of claim 5, wherein at least one of the determining the APC RPA sampling rate, the determining the APC calculated Cpk sampling rate, and the determining the historical Cpk sampling rate comprises using configurable intervals.

7. The method of claim 5, wherein at least one of the determining the APC RPA sampling rate, the determining the APC calculated Cpk sampling rate, and the determining the historical Cpk sampling rate comprises using an S-curve.

8. The method of claim 5, further comprising determining a lot sampling rate based on the APC RPA sampling rate, the APC calculated Cpk sampling rate and the historical Cpk sampling rate.

9. The method of claim 5, further comprising determining a weighted APC RPA sampling rate, a weighted APC calculated Cpk sampling rate and a weighted historical Cpk sampling rate.

10. The method of claim 9, further comprising determining a lot sampling rate based on the weighted APC RPA sampling rate, the weighted APC calculated Cpk sampling rate and the weighted historical Cpk sampling rate.

11. The method of claim 10, wherein the determining the lot sampling rate comprises summing the weighted APC RPA sampling rate, the weighted APC calculated Cpk sampling rate and the weighted historical Cpk sampling rate.

12. The method of claim 1, wherein the calculating the APC RPA distribution value is determined according to:

$$\text{Distribution } (D) = \text{Min}((UCL-\text{Mean})/\text{Sigma}, (\text{Mean}-LCL)/\text{Sigma})$$

wherein UCL is an upper control limit, LCL is a lower control limit, and Sigma is a standard deviation based on approximately ten lots.

13. The method of claim 1, further comprising:
    sending an APC trigger point signal indicating that a first measurement is to be performed and pre-processing measurement data is to be collected on a lot prior to passing the lot through the production process;
    processing the lot comprises utilizing a process tool and the APC; and
    sending a signal to the LSE after the production process is completed requesting a determination on whether sampling of the lot is indicated,
    wherein if sampling is indicated performing a second measurement to collect post-processing measurement data.

14. The method of claim 13, wherein prior to processing the lot the APC calculates the RPA based on feed forward and feed backward information and then communicates the RPA to the LSE and the APC calculates the Cpk value after the second measurement is performed and communicates the Cpk value to the LSE.

15. The method of claim 14, wherein the LSE optimizes a sampling plan of the lot in real time based on the ability of the LSE to determine whether subsequent measurement of the lot is required from the correlation analysis performed on the RPA, the Cpk value and the historical Cpk.

16. A system, comprising:
 a wafer processing station;
 an advanced process control (APC); and
 an enhanced lot sampling engine (ELSE) in communication with the APC and configured to receive APC recipe parameter adjustment (RPA) information and APC calculated process capability (Cpk) information from the APC, and is further configured to determine a sampling rate for a lot based on historical Cpk information, the APC RPA information from the APC and the APC calculated Cpk information from the APC,
 wherein the system utilizes real-time advance process control (APC) information and the ELSE utilizes the APC information to determine an optimized sample plan for processing the lot.

* * * * *